(12) United States Patent
Yamada et al.

(10) Patent No.: US 11,934,717 B2
(45) Date of Patent: Mar. 19, 2024

(54) PRINTING SYSTEM, INFORMATION PROCESSING APPARATUS, AND CONTROL PROGRAM FOR USER AUTHENTICATION

(71) Applicant: SEIKO EPSON CORPORATION, Tokyo (JP)

(72) Inventors: Takeshi Yamada, Matsumoto (JP); Hiroyuki Kuramoto, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/804,546

(22) Filed: May 27, 2022

(65) Prior Publication Data

US 2022/0391152 A1 Dec. 8, 2022

(30) Foreign Application Priority Data

Jun. 4, 2021 (JP) ................................ 2021-094136

(51) Int. Cl.
*G06F 3/12* (2006.01)
(52) U.S. Cl.
CPC .......... *G06F 3/1222* (2013.01); *G06F 3/1238* (2013.01)
(58) Field of Classification Search
None
See application file for complete search history.

(56) References Cited

U.S. PATENT DOCUMENTS

| 2017/0220787 A1* | 8/2017 | Inokuchi | ................. G06F 21/32 |
| 2017/0257519 A1 | 9/2017 | Kuroishi et al. | |
| 2019/0089866 A1* | 3/2019 | Horishita | ........... H04N 1/00251 |

FOREIGN PATENT DOCUMENTS

| EP | 3091709 A1 * | 11/2016 | ......... H04L 63/0861 |
| JP | 2017159465 A | 9/2017 | |

* cited by examiner

*Primary Examiner* — Thomas D Lee
(74) *Attorney, Agent, or Firm* — CHIP LAW GROUP (57) ABSTRACT

A printing system according to an aspect is a printing system in which a printing apparatus and an information processing apparatus are connected via a network, the information processing apparatus receiving image data from an imaging apparatus that images a user of the printing apparatus and performing authentication processing for the user based on the image data, the printing apparatus including a detecting section configured to detect a human body and a transmitting section configured to transmit detection information by the detecting section. The information processing apparatus includes a receiving section configured to receive the detection information and a control section configured to control, based on the detection information, whether to perform the authentication processing.

9 Claims, 7 Drawing Sheets

PRINTING SYSTEM, INFORMATION PROCESSING APPARATUS, AND CONTROL PROGRAM FOR USER AUTHENTICATION

The present application is based on, and claims priority from JP Application Serial Number 2021-094136, filed Jun. 4, 2021, the disclosure of which is hereby incorporated by reference herein in its entirety.

BACKGROUND

1. Technical Field

The present disclosure relates to a printing system in which face authentication is used, an information processing apparatus of the printing system, and a control program for the information processing apparatus.

2. Related Art

There has been known a printing system that, by using a face authentication technique, enables a user to log in without touching an operation panel of a printing apparatus. For example, JP-A-2017-159465 (Patent Literature 1) discloses an image forming apparatus that, when detecting approach of a person, shifts from a power saving mode to a normal mode to actuate a communication section and performs face authentication.

However, when an information processing apparatus that performs face authentication processing is provided separately from the printing apparatus, the information processing apparatus cannot detect beforehand when a user enters an imaging range of a camera and attempts to use the printing apparatus. Therefore, the information processing apparatus continues to perform the face authentication processing on images received from the camera. This is inefficient from the viewpoint of a processing load of the information processing apparatus, power consumption, and the like.

SUMMARY

A printing system according to an aspect is a printing system in which a printing apparatus and an information processing apparatus are connected via a network, the information processing apparatus receiving image data from an imaging apparatus that images a user of the printing apparatus and performing authentication processing for the user based on the image data, the printing apparatus including: a detecting section configured to detect a human body; and a transmitting section configured to transmit detection information by the detecting section. The information processing apparatus includes: a receiving section configured to receive the detection information; and a control section configured to control, based on the detection information, whether to perform the authentication processing.

An information processing apparatus according to an aspect is an information processing apparatus in a printing system in which a printing apparatus, an imaging apparatus, and the information processing apparatus are connected via a network, the printing apparatus including: a detecting section configured to detect a human body; and a transmitting section configured to transmit detection information by the detecting section, the imaging apparatus imaging a user who uses the printing apparatus, the information processing apparatus receiving image data captured by the imaging apparatus and performing authentication processing for the user based on the image data, the information processing apparatus including a receiving section configured to receive the detection information. The information processing apparatus controls, based on the detection information received by the receiving section, whether to perform the authentication processing.

A non-transitory computer-readable storage medium according to an aspect stores a control program to be executed by an information processing apparatus in a printing system in which a printing apparatus, an imaging apparatus, and the information processing apparatus are connected via a network, the printing apparatus including: a detecting section configured to detect a human body; and a transmitting section configured to transmit detection information by the detecting section, the imaging apparatus imaging a user who uses the printing apparatus, the information processing apparatus receiving image data captured by the imaging apparatus and performing authentication processing for the user based on the image data, the control program causing a computer of the information processing apparatus to execute: receiving the detection information; analyzing the detection information; and controlling, based on the detection information, whether to perform the authentication processing.

DESCRIPTION OF EXEMPLARY EMBODIMENTS

First Embodiment

Overview of a Printing System

Figure 1:
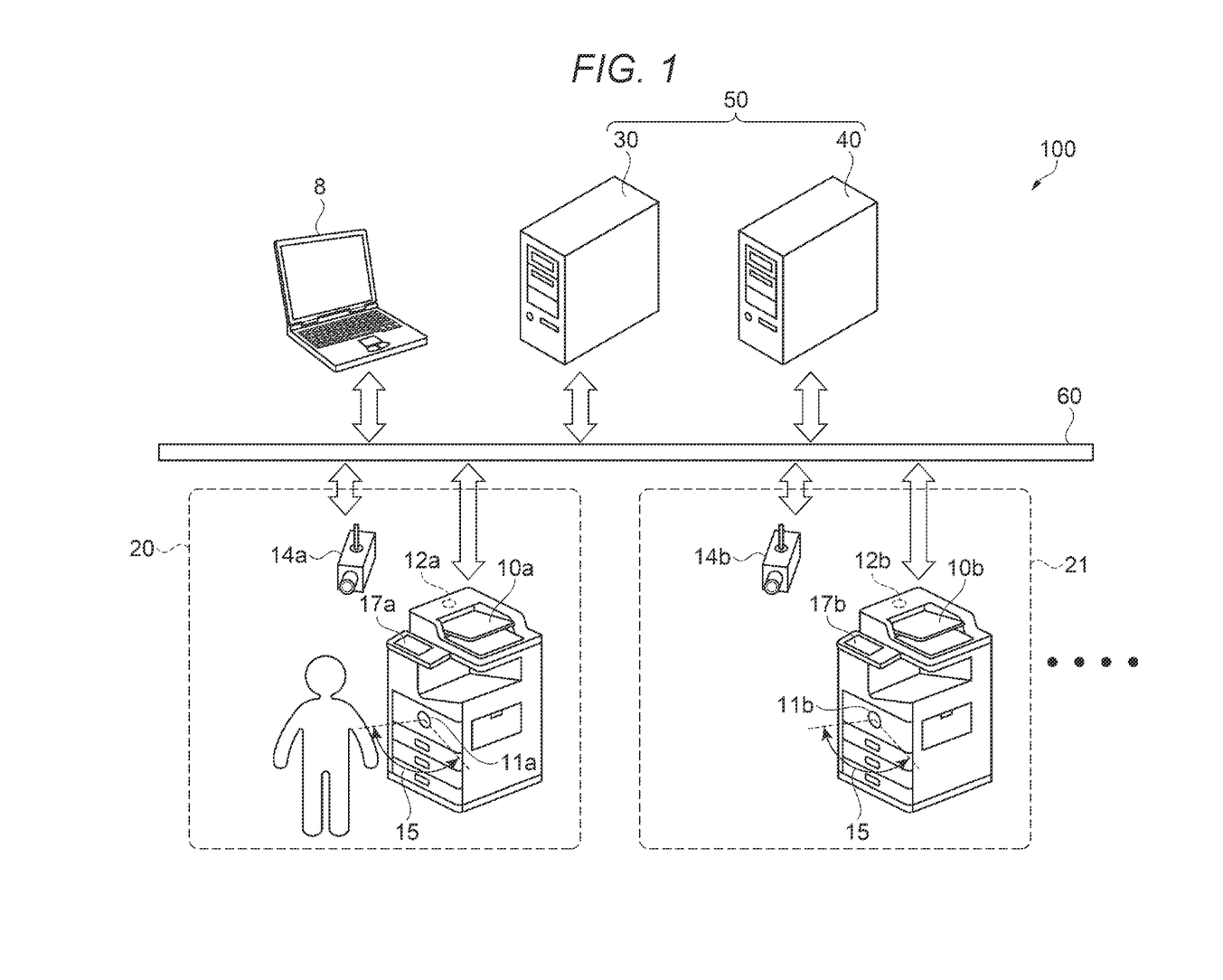
FIG. 1 is a schematic diagram of a printing system according to a first embodiment.

FIG. 1 is a schematic diagram of a printing system according to a first embodiment.

A printing system 100 in this embodiment is a printing system that, when a printing apparatus 10 connected to an in-house LAN (Local Area Network) 60 of a company or the like is used, enables login to the printing apparatus 10 in a noncontact manner by performing face authentication with an information processing apparatus 50 provided separately from the printing apparatus 10. In particular, the printing system 100 includes an energy saving function for, for example, stopping face authentication processing when a user is absent in front of the printing apparatus 10.

As shown in FIG. 1, the printing system 100 is configured from a terminal apparatus 8, a printing apparatus 10a, a camera 14a, a printing apparatus 10b, a camera 14b, the information processing apparatus 50, and the like. In a preferred example, the printing apparatuses 10a and 10b are multifunction peripherals including a printer, a scanner, a copying machine, and a facsimile function. The printing apparatuses 10a and 10b are not limited to the multifunction peripherals and only have to be printing apparatuses connectable to the in-house LAN 60 and may be, for example, single-function printers.

The terminal apparatus 8 is a personal computer such as a notebook PC used for a job by a user. Various document data that need to be printed such as quotations and reports are stored in the terminal apparatus 8. In an example shown in FIG. 1, the printing apparatus 10 is set in each of two rooms 20 and 21. Specifically, the printing apparatus 10a and the camera 14a are set as a pair in the room 20. Similarly, the printing apparatus 10b and the camera 14b are set in the room 21. Three or more rooms may be present. In that case, the printing apparatus 10 and a camera 14 only have to be set in each of the rooms. A plurality of printing corners may be provided in separated places in one spacious room. In the following explanation, since the printing apparatus 10a and the printing apparatus 10b are the same printing apparatus, about common contents, the printing apparatus 10a and the printing apparatus 10b are explained as the printing apparatus 10 without adding branch numbers. About individual contents, the printing apparatus 10a and the printing apparatus 10b are separately explained. The same applies to the cameras 14a and 14b functioning as imaging apparatuses.

The printing apparatus 10a is set in a printing corner of the room 20. A detecting section 11a including a human sensor is provided on a front surface of the printing apparatus 10a. The detecting section 11a can detect whether a user is present in a predetermined region in the front of the printing apparatus 10a. A detection range 15 by the detecting section 11a is a region spreading in a fan shape from the detecting section 11a, and is a region where the distance from the detecting section 11a is equal to or smaller than a predetermined detection distance. As shown in FIG. 1, the detection range 15 has breadth substantially covering the entire front of the printing apparatus 10.

The camera 14a is set, for example, above the back of the printing apparatus 10a and is set to be capable of imaging a face of the user who uses the printing apparatus 10a. For example, when the user of the terminal apparatus 8 performs a job in the room 20 and performs printing, the user performs the printing with the printing apparatus 10a near the user in the room 20. Specifically, after transmitting a print job using a driver of the terminal apparatus 8, the user moves to the front of the printing apparatus 10a.

In FIG. 1, a state at the time when the user moves and approaches the printing apparatus 10a is shown. Specifically, since the user is detected by the detecting section 11a of the printing apparatus 10a, face authentication processing is performed in the information processing apparatus 50 based on image data of the face of the user captured by the camera 14a. The information processing apparatus 50 includes a printing server 30 that manages a plurality of printing apparatuses 10 and a face authentication server 40 that performs face authentication. When succeeding in the face authentication, the user can log in to the printing apparatus 10a and perform printing.

On the other hand, when the user approaches neither the printing apparatus 10a nor the printing apparatus 10b, the information processing apparatus 50 performs an energy saving operation for, for example, stopping the face authentication processing.

Functional Block Configurations of the Apparatuses

Figure 2:
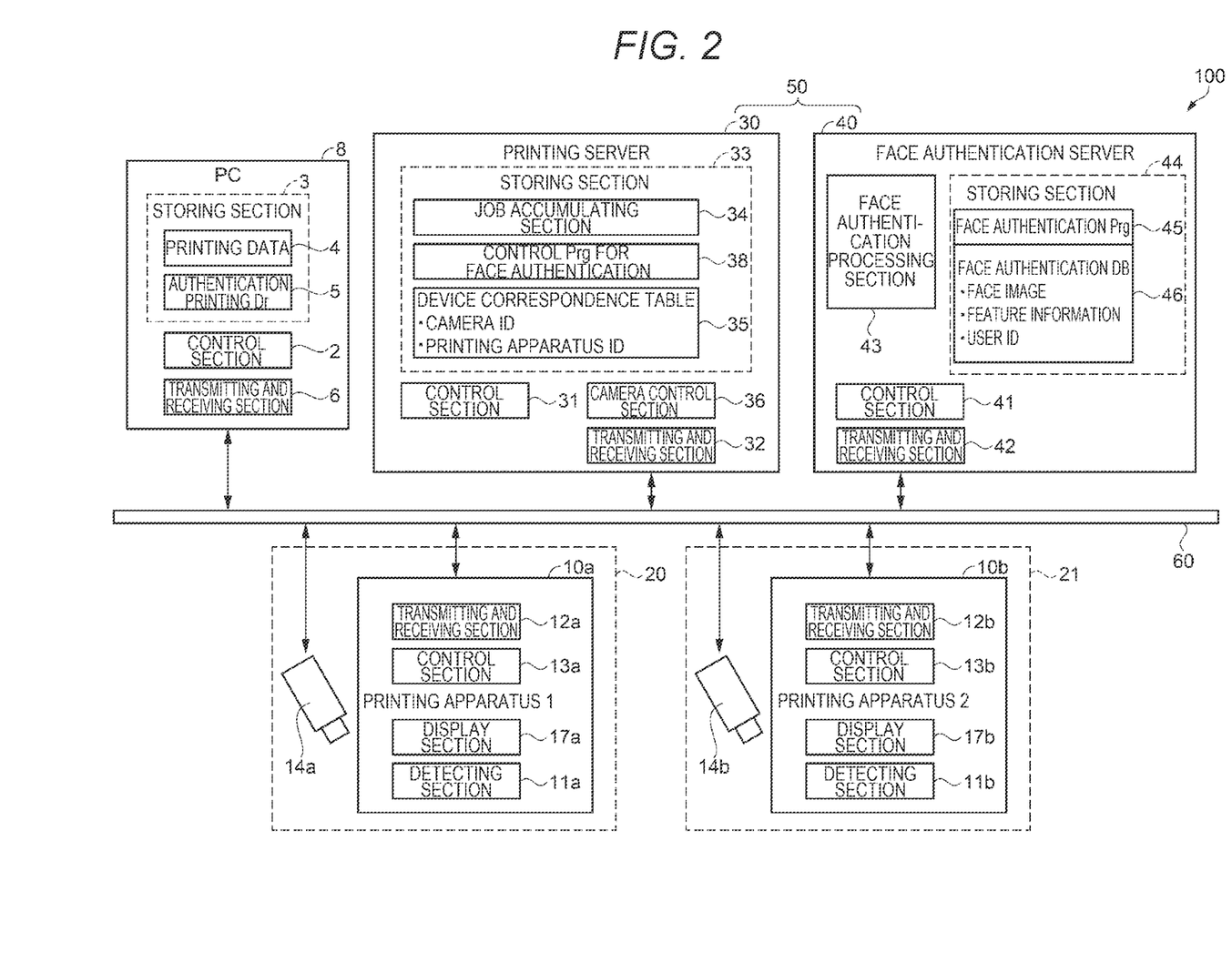
FIG. 2 is a functional block diagram of devices in a printing apparatus.

FIG. 2 is a diagram showing functional blocks of the devices in the printing apparatus.

Functional block configurations of the apparatuses in the printing system 100 are explained with reference to FIG. 2.

The terminal apparatus 8 is, for example, a notebook PC and includes a control section 2 including one or a plurality of processors, a display section such as a liquid crystal display, an operation section such as a keyboard or a mouse, a storing section 3 including volatile and nonvolatile memories, and a transmitting and receiving section 6, which is a LAN connection unit including a LAN connection terminal.

In the storing section 3, an OS (Operating System), application programs, a driver for authentication printing 5 of the printing apparatus 10, document data 4, and the like are stored. In the storing section 3, incidental data such as a user authentication ID (Identification) and a department authentication ID used when printing is performed by the authentication printing driver 5 under an environment of the printing system 100 is managed by the OS.

The printing apparatus 10 includes a control section 13 including one or a plurality of processors, a detecting section 11, a transmitting and receiving section 12, which is a LAN connection unit including a connection terminal, a display section 17 formed by a liquid crystal panel including a touch panel, a printing unit, a scanner unit, and the like.

The detecting section 11 is a human body detection circuit including an infrared sensor that senses an infrared ray radiated by a human body and changes the infrared ray to an electric signal. As the infrared sensor, a pyroelectric sensor and a thermopile sensor can be used. The infrared sensor only has to be a sensor capable of detecting a human body. For example, an ultrasonic sensor may be used.

The camera 14 is a monitoring camera including an image sensor such as a CCD (Charge Coupled Device) and a LAN connection unit including a connection terminal.

In this embodiment, as explained above, the information processing apparatus 50 is explained as being configured from a plurality of servers (the printing server 30 and the face authentication server 40). However, the printing server 30 and the face authentication server 40 may be configured by one server.

The printing server 30 is a printing authentication server that manages the plurality of printing apparatuses 10. The printing server 30 includes a control section 31 including one or a plurality of processors, a transmitting and receiving section 32, which is a LAN connection unit including a connection terminal, a storing section 33 including volatile and nonvolatile memories, and a camera control section 36 that controls the operations of a plurality of cameras 14.

In the storing section 33, an OS, a plurality of programs including a control program 38 for face authentication, a device correspondence table 35, and the like are stored. A job accumulating section 34 that temporarily stores a plurality of printing data received from the terminal apparatus 8 is secured. In the device correspondence table 35, an ID of the printing apparatus 10 and an ID of the camera 14 paired with the printing apparatus 10 are linked and stored.

The face authentication server 40 is a face authentication server that performs face authentication for the user. The face authentication server 40 includes a control section 41 including one or a plurality of processors, a transmitting and receiving section 42, which is a LAN connection unit including a connection terminal, a storing section 44 including volatile and nonvolatile memories, a face authentication processing section 43 that performs face authentication processing, and the like.

In the storing section 44, an OS, a plurality of control programs including a face authentication program 45, a face authentication database 46, and the like are stored. In the face authentication database 46, information necessary for the face authentication processing such as image data of faces of a registered plurality of users, feature information, which is information concerning feature points of the faces, and a plurality of user IDs linked with the image data of the faces is stored.

Imaging Range of the Camera

Figure 3:
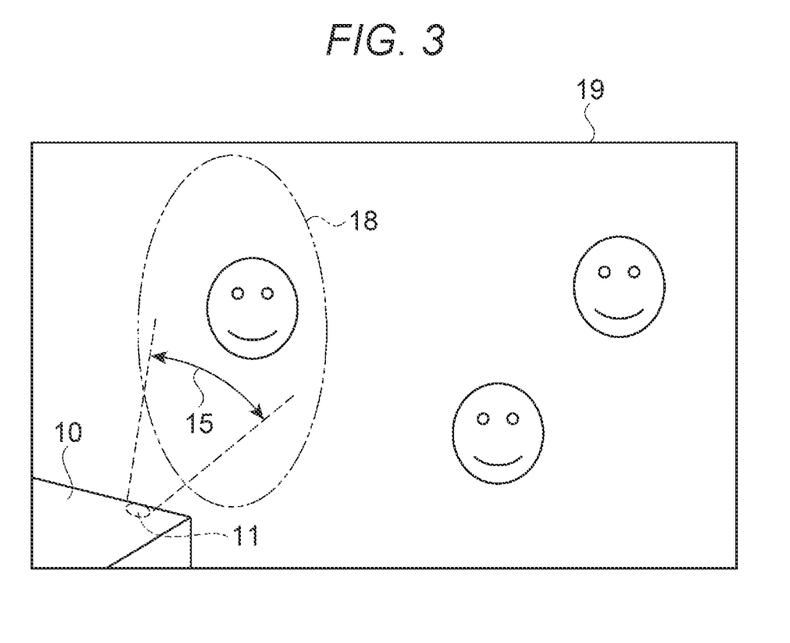
FIG. 3 is a schematic diagram showing an imaging range of a camera.

FIG. 3 is a schematic diagram showing an imaging range of the camera.

FIG. 3 shows a relation between an imaging range 19 of the camera 14 and a face authentication range 18 used as image data of a face, which is a target of face authentication. The imaging range 19 is a laterally long rectangle. In an example shown in FIG. 3, faces of three people are observed in the imaging range 19.

The face authentication range 18 is set by the face authentication server 40 to substantially coincide with the detection range 15 by the detecting section 11 of the printing apparatus 10. In other words, the face authentication range 18 substantially coinciding with the detection range 15 is cut out from the imaging range 19 by the face authentication server 40. As explained above, the detection range 15 of the detecting section 11 has the breadth substantially covering the entire front of the printing apparatus 10. The face authentication range 18 for performing face authentication corresponds to the detection range 15.

In the example shown in FIG. 3, out of three faces, one face located within the detection range 15 of the detecting section 11 is cut out as image data indicating a face of the user. The face authentication range 18 in a preferred example is set to a predetermined range larger than a longitudinally long elliptical detection range. Consequently, even when a plurality of faces are present within the imaging range 19, a face located in front of the printing apparatus 10 is narrowed down as image data for face authentication. The face authentication range 18 is formed in the longitudinally long elliptical shape because the position of the face of the user in a standing state is fit within the range irrespective of the height of the user.

The face authentication range 18 is individually set for each of the printing corners by a dedicated application for setting the face authentication range 18 in initial setting in setting the printing apparatuses 10 and the cameras 14 in the printing corners.

Flow of the Face Authentication Processing

Figure 4:
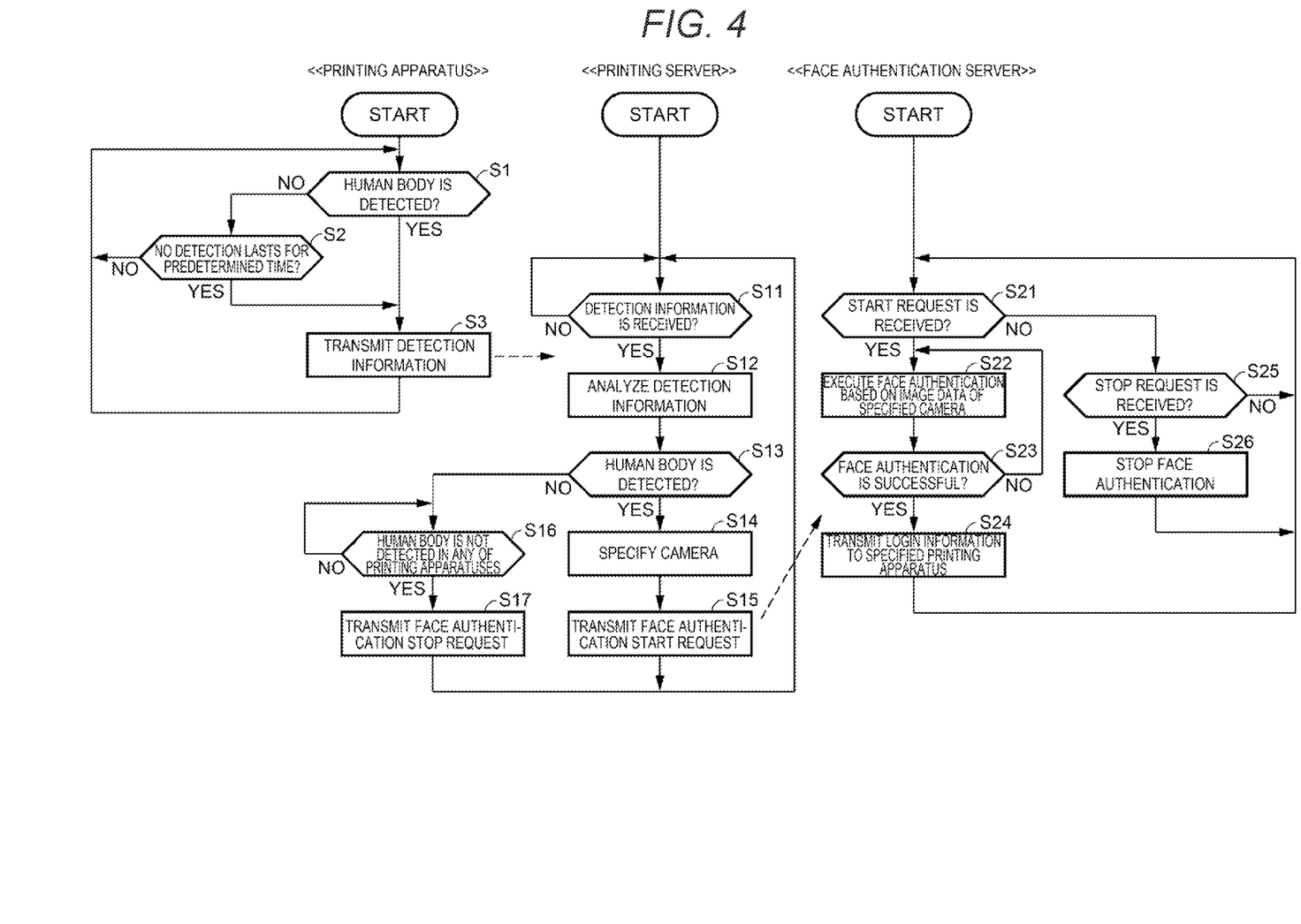
FIG. 4 is a flowchart showing a flow of face authentication processing.

FIG. 4 is a flowchart showing a flow of the face authentication processing.

Subsequently, a control form of the face authentication processing is explained mainly with reference to FIG. 4 and with reference to FIGS. 1 and 2 as appropriate.

First, the operation of the printing apparatus 10 is explained. The control section 13 of the printing apparatus 10 functions as the subject of the operation and controls the sections, whereby the operation of processing explained below is executed.

In step S1, the control section 13 determines whether a human body is detected in front of the printing apparatus 10 by the detecting section 11. Specifically, as shown in FIG. 1, the control section 13 detects, according to a detection signal of the infrared sensor, whether the user is present within the detection range 15 of the detecting section 11. When the user approaches the printing apparatus 10 and a human body is detected by the infrared sensor, the control section 13 proceeds to step S3. When a human body is not detected, the control section 13 proceeds to step S2. The human body means an organism of the user.

In step S2, the control section 13 determines whether a state in which a human body is not detected lasts for a predetermined time. When the state lasts for the predetermined time, the control section 13 proceeds to step S3. When the state does not last for the predetermined time, the control section 13 returns to step S1. The predetermined time is preferably set to, for example, approximately five to ten minutes but is not limited to this. The control section 13 may proceed to step S3 every time of sampling without waiting for the predetermined time elapses.

In step S3, the control section 13 transmits detection information indicating presence or absence of the user detected in step S1 to the printing server 30 from the transmitting and receiving section 12 functioning as a transmitting section. An ID of a printing apparatus that transmits the detection information is attached to the detection information.

The operation of the printing server 30 is explained. The control program 38 for face authentication is executed in the printing server 30 and the control section 31 functions as the subject of the operation and controls the sections, whereby the operation of processing explained below is executed. It is assumed that a print job has been transmitted to the printing server 30 from the terminal apparatus 8 and the print job is stored in the job accumulating section 34 in a state in which the print job is linked with a user ID.

In step S11, the control section 31 determines whether detection information is received from the printing apparatus 10. Specifically, the control section 31 checks presence or absence of reception of detection information in the transmitting and receiving section 32 functioning as a receiving section. When detection information is received, the control section 31 proceeds to step S12. When detection information is not received, the control section 31 continues to wait for detection information.

In step S12, the control section 31 analyzes the received detection information. An analysis result is linked with an ID of a printing apparatus that transmits the detection information and stored.

In step S13, the control section 31 determines whether the analysis result of the detection information indicates that a human body is detected. When a human body is detected, the control section 31 proceeds to step S14. When a human body is not detected, the control section 31 proceeds to step S16. In other words, the control section 31 controls, based on the detection information, whether to perform the authentication processing.

In step S14, the control section 31 specifies the camera 14 paired with the printing apparatus 10 that the user approaches. Specifically, the control section 31 specifies, from the device correspondence table 35, an ID of the camera 14 paired with the printing apparatus 10 that transmits the detection information indicating that the human body is detected.

In step S15, the control section 31 transmits a face authentication start request from the transmitting and receiving section 32 to the face authentication server 40. ID information of the camera 14 specified in step S14 is also attached to the face authentication start request. After the transmission, the control section 31 returns to step S11.

In step S16, the control section 31 determines whether a human body is not detected in all of the printing apparatuses 10. When a human body is not detected in all of the printing apparatuses 10, the control section 31 proceeds to step S17. When a human body is detected, the control section 31 returns to step S16.

In step S17, the control section 31 transmits a face authentication stop request from the transmitting and receiving section 32 to the face authentication server 40. This is because, since a human body is not detected in any of the printing apparatuses 10, the face authentication processing may be stopped. Following the transmission of the face authentications stop request, the control section 31 may transmit an imaging stop command to all of the cameras 14 with the camera control section 36. This is because, since the user is absent in all of the printing corners, the imaging may be stopped.

The operation of the face authentication server 40 is explained. The control section 41 of the face authentication server 40 functions as the subject of the operation and controls the sections, whereby the operation of processing explained below is executed.

In step S21, the control section 41 determines whether a face authentication start request is received from the printing server 30. When the face authentication start request is received, the control section 41 proceeds to step S22. When the face authentication start request is not received, the control section 41 proceeds to step S25.

In step S22, the control section 41 executes face authentication processing based on image data received from the camera 14 specified in step S14. Specifically, the face authentication program 45 is executed and face authentication processing including collation of a face of the specified image data and image data of faces of a plurality of users in the face authentication database 46 is performed.

In step S23, the control section 41 determines whether the face authentication is successful. When the face authentication is successful, the control section 41 proceeds to step S24. When the face authentication is unsuccessful, the control section 41 returns to step S22.

In step S24, the face authentication server 40 transmits authentication result information including an ID of a user succeeding in authentication to the printing server 30. Subsequently, when receiving the authentication result information, the printing server 30 transmits screen information to the printing apparatus 10 at a transmission source of the detection information to thereby cause the display section of the printing apparatus 10 to display a predetermined screen. For example, when a job of the user succeeding in the authentication is not stored in the printing server 30, the printing server 30 transmits screen information of a home screen to thereby cause the display section of the printing apparatus 10 to display the home screen. When only one job of the user succeeding in the authentication is stored in the printing server 30, the printing server 30 transmits printing data of the one job to the printing apparatus 10 to thereby cause the printing apparatus 10 to execute printing of the one job. On the other hand, when a plurality of jobs of the user succeeding in the authentication are stored in the printing server 30, the printing server 30 transmits list information of the plurality of jobs to thereby cause the display section of the printing apparatus 10 to display a job list screen. When the user selects a desired job from the job list screen, the printing server 30 transmits printing data of the selected job to the printing apparatus 10 and causes the printing apparatus 10 to execute printing.

In step S25, the control section 41 determines whether the face authentication stop request is received from the printing server 30. When the face authentication stop request is received, the control section 41 proceeds to step S26. When the face authentication stop request is not received, the control section 41 returns to step S21.

In step S26, the control section 41 stops the face authentication processing including the face authentication program 45.

Operation Form after Login

Figure 5:
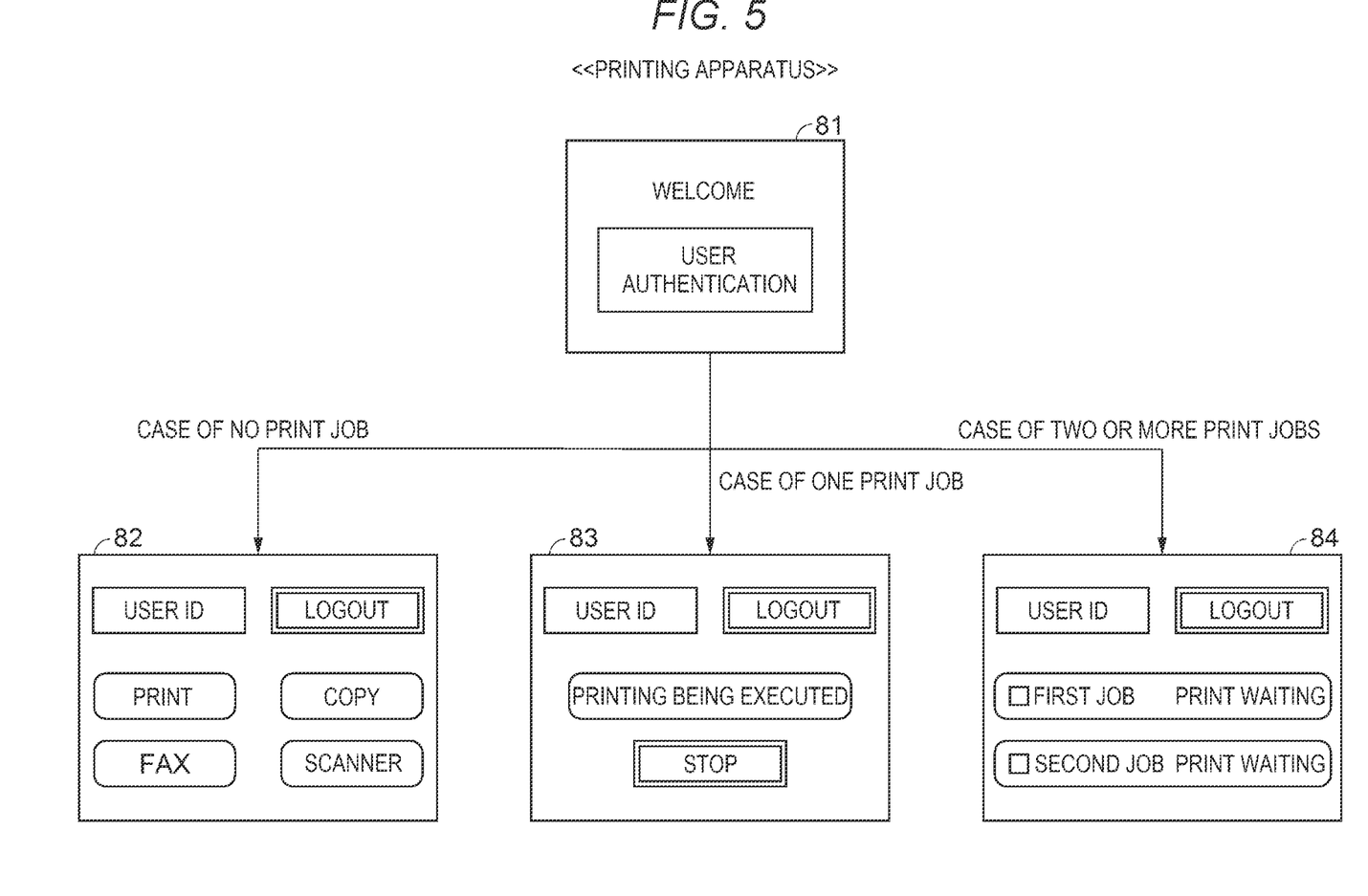
FIG. 5 is a mode diagram of a display screen of the printing apparatus after login.

FIG. 5 is a diagram showing an example of a display screen of the printing apparatus after login.

The operation of the printing apparatus 10 at the time when face authentication is successful is explained in transition of a screen displayed on the display section 17. In the following explanation, it is assumed that face authentication for a user moving to the front of the printing apparatus 10a shown in FIG. 1 is successful.

A screen displayed on a display section 17a of the printing apparatus 10a is different according to the number of print jobs of a user succeeding in authentication stored by the printing server 30. Specifically, when there is one print job, the printing server 30 transmits the print job of the user succeeding in the authentication to the printer to thereby shift to a screen 83. The print job is automatically performed.

There is "user ID" display in an upper part of the screen 83 and a "logout" button is displayed next to the "user ID". Display indicating "printing being executed" is present in a middle part. A "stop" button is displayed in a lower part. Since the display section 17a includes a touch panel, when the user desires to stop printing, the user can stop the printing by touching the "stop" button. Similarly, if the user touches the "logout" button, logout processing is performed. In this way, when there is one print job, the user can perform the printing without touching the printing apparatus 10a.

When there are a plurality of received print jobs, the control section 41 shifts to a screen 84. The screen 84 is an example in the case in which there are two print jobs.

On the screen 84, there is "user ID" display in an upper part and a "logout" button is displayed next to the "user ID". A "first job print waiting" button and a "second job print waiting" button are displayed as a list under the "user ID" and the "logout" button. For example, when desiring to perform only a first job, the user presses the "first job print waiting" button for two seconds or more. The user only has to check a check box and then touch the "first job print waiting" button. When desiring to perform two print jobs, the user only has to check two check boxes and then press one of the two buttons long for two or more seconds. An operation form is not limited to this method and only has to be an operation method capable of, in a state in which a plurality of print jobs are displayed as a list, selecting all of the plurality of print jobs one by one.

When there is no print job, the control section 41 shifts to a screen 82.

On the screen 82, there is "user ID" display in an upper part and a "logout" button is displayed next to the "user ID". A "print" button, a "copy" button, a "FAX" button, and a "scanner" button are displayed under the "user ID" and the "logout" button. The user can operate any one of the buttons according to work content.

As explained above, with the printing system 100, the information processing apparatus 50, and the control program for the information processing apparatus 50 in this embodiment, the following effects can be obtained.

The printing system 100 is a printing system in which the printing apparatus 10, the camera 14 that images a user who uses the printing apparatus 10, and the information processing apparatus 50 that receives image data captured by the camera 14 and performs authentication processing for the user based on the image data are connected via a network. The printing apparatus 10 includes the detecting section 11 that detects a human body and the transmitting and receiving section 12 functioning as a transmitting section that transmits detection information by the detecting section 11. The information processing apparatus 50 includes the transmitting and receiving section 32 functioning as a receiving section that receives the detection information and the control section 31 that controls, based on the detection information, whether to perform the authentication processing.

With the printing system 100, it is possible to control, based on the detection information, whether to perform the authentication processing. Therefore, when a person is not detected and a user is absent, the authentication processing such as face authentication can be stopped. Accordingly, unlike the system of the related art that continues the face authentication processing even if the user is absent, it is possible to reduce a processing load of the information processing apparatus 50 and reduce power consumption.

Therefore, it is possible to provide the printing system 100 that reduces energy consumption by performing efficient processing according to presence or absence of the user.

The control section 31 executes the authentication processing when the detection information indicates that a human body is detected. Specifically, the control section 31 transmits a face authentication request from the printing server 30 to the face authentication server 40 and executes the face authentication processing.

Consequently, the authentication processing can be executed when the user is present in front of the printing apparatus 10.

The control section 31 does not execute the authentication processing when the detection information indicates that a human body is not detected. Specifically, the control section 31 transmits a face authentication stop request from the printing server 30 to the face authentication server 40 and stops the face authentication processing.

Consequently, it is possible to reduce a processing load of the information processing apparatus 50 and reduce power consumption by stopping the authentication processing such as face authentication when the user is absent.

The control section 31 does not execute the authentication processing when the detection information indicating that a human body is not detected lasts for a predetermined time.

Consequently, it is possible to stop the authentication processing after surely confirming that the user is absent.

The control section 31 stops the imaging by the camera 14 when the authentication processing is not executed. Specifically, the control section 31 transmits an imaging stop command to all of the cameras 14 with the camera control section 36 following the transmission of the face authentication stop request.

Consequently, it is possible to reduce a processing load of the camera 14 in addition to the information processing apparatus 50 and further reduce power consumption.

The authentication processing is face authentication for authenticating a face of a user. A range in which the face authentication is performed in image data captured by the camera 14 corresponds to a detection range of the human body detection by the detecting section 11. Specifically, the face authentication range 18 is provided to substantially coincide with the detection range 15 by the detecting section 11 of the printing apparatus 10.

Consequently, even when there are a plurality of faces within the imaging range 19 of the camera 14, a face located in front of the printing apparatus 10 is cut out as image data for face authentication. Accordingly, since the user of the printing apparatus 10 can be surely specified, accuracy of the face authentication can be improved.

The information processing apparatus 50 is an information processing apparatus in the printing system 100 including the printing apparatus 10 including the detecting section 11 that detects a human body and the transmitting and receiving section 12 that transmits detection information by the detecting section 11, the camera 14 that images a user who uses the printing apparatus 10, and the information processing apparatus 50 that receives image data captured by the camera 14 and performs authentication processing for the user based on the image data. The information processing apparatus 50 includes the transmitting and receiving section 32 that receives the detection information. The information processing apparatus 50 controls, based on the detection information received by the transmitting and receiving section 32, whether to perform authentication processing.

With the information processing apparatus 50, it is possible to control, based on the detection information, whether to perform the authentication processing. Therefore, when a person is not detected and a user is absent, the authentication processing such as face authentication can be stopped. Accordingly, it is possible to reduce a processing load of the information processing apparatus 50 and reduce power consumption. Therefore, it is possible to provide the information processing apparatus 50 that reduces energy consumption by performing efficient processing according to presence or absence of the user.

The control program 38 is a control program for face authentication executed by the information processing apparatus 50 in the printing system 100 including the printing apparatus 10 including the detecting section 11 that detects a human body and the transmitting and receiving section 12 that transmits detection information by the detecting section 11, the camera 14 that images a user who uses the printing apparatus 10, and the information processing apparatus 50 that receives image data captured by the camera 14 and performs authentication processing for the user based on the image data. The control program 38 includes receiving the detection information, analyzing the detection information, and controlling, based on the detection information, whether to perform authentication processing.

With the control program 38, it is possible to control, based on the detection information, whether to perform the authentication processing. Therefore, when a person is not detected and a user is absent, the authentication processing such as face authentication can be stopped. Accordingly, it is possible to reduce a processing load of the information processing apparatus 50 and reduce power consumption. Therefore, it is possible to provide the control program 38 for the information processing apparatus 50 that reduces energy consumption by performing efficient processing according to presence or absence of a user.

Second Embodiment

Different Form of Camera Setting

Figure 6:
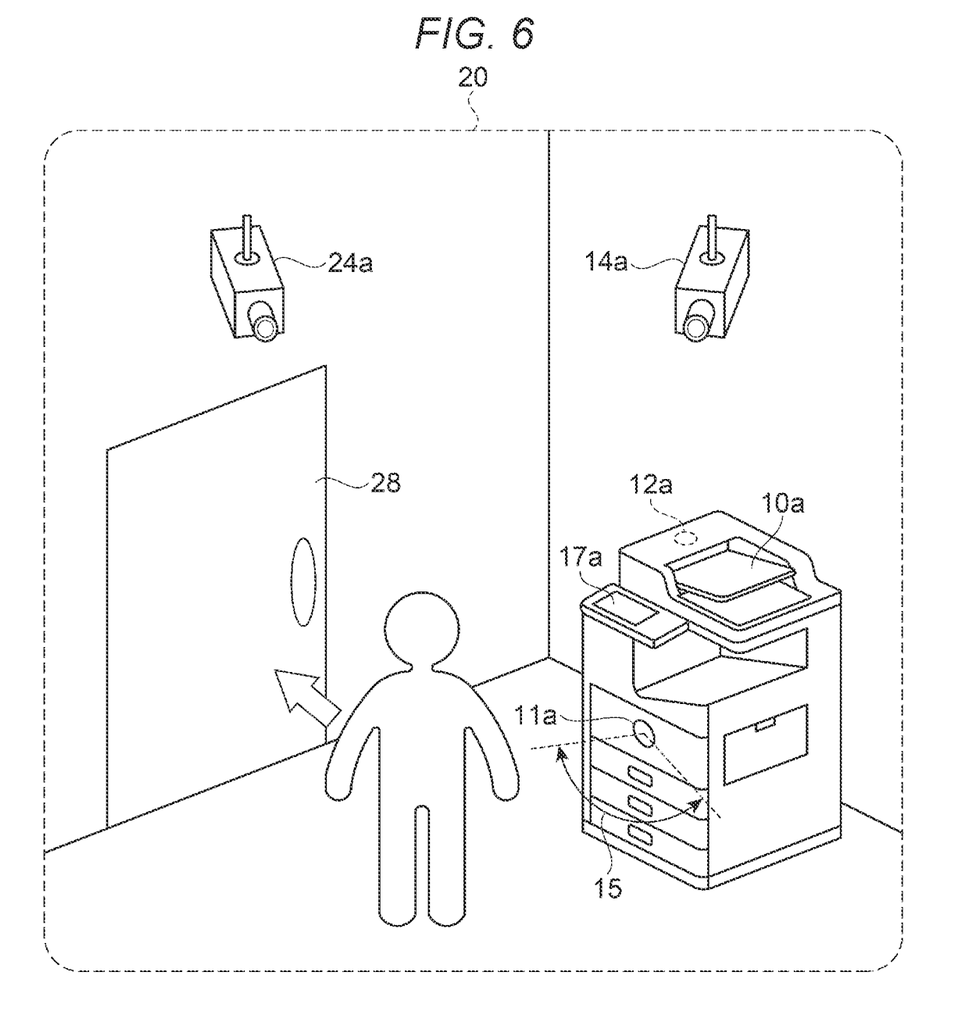
FIG. 6 is a schematic diagram of a printing system according to a second embodiment.

FIG. 6 is a schematic diagram of a printing system according to a second embodiment and corresponds to FIG. 1.

Figure 7:
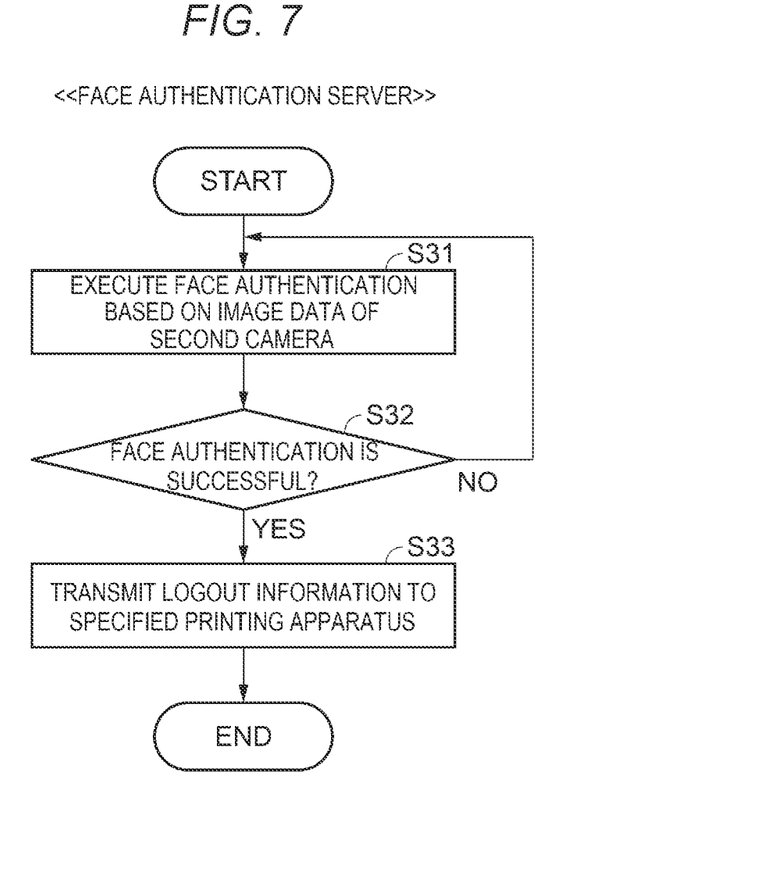
FIG. 7 is a flowchart showing a flow of logout processing.

FIG. 7 is a flowchart showing a flow of logout processing.

In the first embodiment, the camera 14 functioning as the imaging apparatus is only one camera for login. However, a camera for logout may be provided. FIG. 6 is a schematic diagram in which a two-camera configuration in this embodiment is applied in the printing corner in the room 20 shown in FIG. 1. The same components as the components in the first embodiment are denoted by the same reference numerals and signs and redundant explanation of the components is omitted.

As shown in FIG. 6, the printing corner in the room 20 is a small room. A door 28 for entry and exit is provided in the small room. A second camera 24a is set above the door 28. The second camera 24a is the same camera as the camera 14a above the printing apparatus 10a. However, an imaging direction of the second camera 24a is a facing direction of the door 28. In other words, the second camera 24a is set to be capable of imaging a face of a user who finishes printing and exits the printing corner. Otherwise, the configurations of the printing apparatus 10a and the camera 14a are the same as the configurations explained in the first embodiment. The camera 14a is referred to a first camera 14a for login as well.

When the two cameras 14a and 24a for login and logout are provided, the information processing apparatus 50 executes face authentication by image data captured by the second camera 24a in order to confirm exit of the user after the user logs in to the printing apparatus 10a. FIG. 7 shows a flow of face authentication processing by image data of the second camera 24a. The face authentication server 40 executes the processing based on an instruction of the printing server 30.

In step S31, the face authentication server 40 executes the face authentication processing by the image data of the second camera 24a. Since the face authentication processing is face authentication for confirming exit of the user who logs in to the printing apparatus 10a, the face authentication server 40 only has to perform collation of a face in the image data of the second camera 24a and image data of the face of the user in the face authentication database 46. Accordingly, a processing time of the face authentication decreases.

In step S32, the face authentication server 40 determines whether the face authentication is successful. When the face authentication is successful, the face authentication server 40 proceeds to step S33. When the face authentication is unsuccessful, the face authentication server 40 returns to step S31.

In step S33, the face authentication server 40 transmits logout information to the printing apparatus 10a. This is because the exit of the user who uses the printing apparatus 10a is successfully confirmed by image data of the second camera 24a for logout. In other words, when the user who uses the printing apparatus 10a according to the face authentication based on the image data of the first camera 14a is authenticated again based on the image data of the second camera 24a, the user is logged out from the printing apparatus 10a.

The detection by the detecting section 11a of the printing apparatus 10a may be performed in addition to the detection by the second camera 24a. Specifically, when the user who uses the printing apparatus 10a according to the face authentication based on the image data of the first camera 14a is authenticated again based on the image data of the second camera 24a and the detection information by the detecting section 11a indicates that a human body is not detected, the logout information may be transmitted to the printing apparatus 10a.

As explained above, with the printing system in this embodiment, the following effects can be obtained in addition to the effects in the first embodiment.

The camera of the printing system includes the first camera 14a for login and the second camera 24a for logout. When the user who uses the printing apparatus 10a according to the face authentication based on the image data of the first camera 14a is authenticated again based on the image data of the second camera 24a, the user is logged out from the printing apparatus 10a.

Consequently, it is possible to detect exit of the user in a timely manner. Accordingly, when the user is absent, the authentication processing such as face authentication can be stopped. Therefore, it is possible to reduce a processing load of the information processing apparatus 50 and reduce power consumption.

When the user who uses the printing apparatus 10a according to the face authentication based on the image data of the first camera 14a is authenticated again based on the image data of the second camera 24a and the detection information by the detecting section 11a indicates that a human body is not detected, the user is logged out from the printing apparatus 10a.

Consequently, it is possible to surely detect exit of the user. Accordingly, when the user is absent, the authentication processing such as face authentication can be stopped. Therefore, it is possible to reduce a processing load of the information processing apparatus 50 and reduce power consumption.

What is claimed is:

1. A printing system in which a printing apparatus and an information processing apparatus are connected via a network, the information processing apparatus receiving image data from an imaging apparatus that images a user of the printing apparatus and performing authentication processing for the user based on the image data,
the printing apparatus comprising:
a sensor configured to detect a human body; and
a first processor configured to transmit detection information of the sensor, wherein
the information processing apparatus includes:
a connection terminal configured to receive the detection information; and
a second processor configured to control, based on the detection information, whether to perform the authentication processing,
the authentication processing is face authentication for authenticating a face of the user,
the imaging apparatus includes a first imaging apparatus for login and a second imaging apparatus for logout, and
when the user who uses the printing apparatus according to the face authentication based on image data of the first imaging apparatus is authenticated again based on image data of the second imaging apparatus, the user is logged out from the printing apparatus.

2. The printing system according to claim 1, wherein, when the detection information indicates that the human body is detected, the second processor executes the authentication processing.

3. The printing system according to claim 1, wherein, when the detection information indicates that the human body is not detected, the second processor does not execute the authentication processing.

4. The printing system according to claim 3, wherein, when the authentication processing is not executed, the second processor stops imaging by the imaging apparatus.

5. The printing system according to claim 1, wherein, when the detection information indicating that the human body is not detected lasts for a predetermined time, the second processor stops processing of the authentication processing.

6. The printing system according to claim 1, wherein when the user who uses the printing apparatus according to the face authentication based on image data of the first imaging apparatus is authenticated again based on image data of the second imaging apparatus and the detection information indicates that the human body is not detected, the user is logged out from the printing apparatus.

7. An information processing apparatus in a printing system in which a printing apparatus, an imaging apparatus, and the information processing apparatus are connected via a network, the printing apparatus including:
- a sensor configured to detect a human body; and
- a first processor configured to transmit detection information of the sensor, wherein
  - the imaging apparatus executes imaging of a user who uses the printing apparatus,
  - the information processing apparatus receives image data captured by the imaging apparatus and performs authentication processing for the user based on the image data,
  - the information processing apparatus comprises a connection terminal configured to receive the detection information,
  - the information processing apparatus controls, based on the detection information received by the connection terminal, whether to perform the authentication processing,
  - the authentication processing is face authentication for authenticating a face of the user,
  - the imaging apparatus includes a first imaging apparatus for login and a second imaging apparatus for logout, and
  - when the user who uses the printing apparatus according to the face authentication based on image data of the first imaging apparatus is authenticated again based on image data of the second imaging apparatus, the user is logged out from the printing apparatus.

8. A non-transitory computer-readable storage medium storing a control program to be executed by an information processing apparatus in a printing system in which a printing apparatus, an imaging apparatus, and the information processing apparatus are connected via a network, the printing apparatus including:
- a sensor configured to detect a human body; and
- a first processor configured to transmit detection information of the sensor, wherein
  - the imaging apparatus executes imaging of a user who uses the printing apparatus,
  - the information processing apparatus receives image data captured by the imaging apparatus and performs authentication processing for the user based on the image data,
  - the control program causes a computer of the information processing apparatus to execute:
    - receiving the detection information;
    - analyzing the detection information; and
    - controlling, based on the detection information, whether to perform the authentication processing, wherein
      - the authentication processing is face authentication for authenticating a face of the user,
      - the imaging apparatus includes a first imaging apparatus for login and a second imaging apparatus for logout, and
      - when the user who uses the printing apparatus according to the face authentication based on image data of the first imaging apparatus is authenticated again based on image data of the second imaging apparatus, the user is logged out from the printing apparatus.

9. A printing system in which a printing apparatus and an information processing apparatus are connected via a network, the information processing apparatus receiving image data from an imaging apparatus that images a user of the printing apparatus and performing authentication processing for the user based on the image data, the printing apparatus comprising:
- a sensor configured to detect a human body; and
- a first processor configured to transmit detection information of the sensor, wherein
  - the information processing apparatus includes:
    - a connection terminal configured to receive the detection information; and
    - a second processor configured to control, based on the detection information, whether to perform the authentication processing,
  - the authentication processing is face authentication for authenticating a face of the user,
  - the imaging apparatus includes a first imaging apparatus for login and a second imaging apparatus for logout, and
  - when the user who uses the printing apparatus according to the face authentication based on image data of the first imaging apparatus is authenticated again based on image data of the second imaging apparatus and the detection information indicates that the human body is not detected, the user is logged out from the printing apparatus.

\* \* \* \* \*